United States Patent
Saur et al.

(10) Patent No.: US 10,302,932 B2
(45) Date of Patent: *May 28, 2019

(54) MICROSCOPE SYSTEM AND MICROSCOPY METHOD USING DIGITAL MARKERS

(71) Applicant: Carl Zeiss Meditec AG, Jena (DE)

(72) Inventors: Stefan Saur, Aalen (DE); Marco Witzbach, Stuttgart (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,886

(22) Filed: Oct. 24, 2018

(65) Prior Publication Data

US 2019/0056582 A1 Feb. 21, 2019

Related U.S. Application Data

(63) Continuation of application No. 14/630,915, filed on Feb. 25, 2015, now Pat. No. 10,139,614.

(51) Int. Cl.
*H04N 9/47* (2006.01)
*G02B 21/36* (2006.01)
*G02B 21/00* (2006.01)

(52) U.S. Cl.
CPC ....... *G02B 21/367* (2013.01); *G02B 21/0012* (2013.01); *G02B 21/368* (2013.01)

(58) Field of Classification Search
CPC . G02B 21/367; G02B 21/0012; G02B 21/368

(Continued)

(56) References Cited

U.S. PATENT DOCUMENTS

| 7,990,430 B2 | 8/2011 | Okamoto |
| 2002/0048403 A1 | 4/2002 | Guerreri |

(Continued)

FOREIGN PATENT DOCUMENTS

| DE | 102006010767 | 9/2007 |
| DE | 102007054450 | 5/2008 |
| DE | 102010039289 | 2/2012 |

OTHER PUBLICATIONS

German Office Action for 10 2014 102 425.7 dated Oct. 21, 2014.

(Continued)

*Primary Examiner* — Jayanti K Patel
*Assistant Examiner* — Richard B Carter
(74) *Attorney, Agent, or Firm* — Nixon Peabody LLP; Jeffrey L. Costellia

(57) ABSTRACT

A microscope system (1) includes a microscope and a camera (3) for generating and recording image-based information on an area of observation. A storage and evaluation unit (4) is connected to the microscope (2) and the camera (3) for detecting parameter settings of the microscope associated with the image-based information. A display (5) renders visible the digital image of the area of observation, and a control unit (6) is connected to the storage and evaluation unit (4) and to the display (5). The control unit (6) places digital markers for marking observed objects in a digital image of the area of observation and displays the digital markers on the display (5). The storage and evaluation unit (4) selects and stores information on each digital marker so that the marker can be associated at a later point in time with the position of the observed object.

9 Claims, 1 Drawing Sheet

(58) Field of Classification Search
USPC .......................................................... 348/79
See application file for complete search history.

(56)     References Cited

U.S. PATENT DOCUMENTS

| | | |
|---|---|---|
| 2009/0012505 A1 | 1/2009 | Chernyak |
| 2009/0059363 A1 | 3/2009 | Straehle et al. |
| 2009/0213214 A1 | 8/2009 | Yamada |
| 2011/0091964 A1 | 4/2011 | Tateyama |
| 2011/0280810 A1 | 11/2011 | Hanger et al. |
| 2012/0033064 A1 | 2/2012 | Yamada et al. |
| 2012/0038761 A1 | 2/2012 | Sander |
| 2013/0076863 A1 | 3/2013 | Rappel |
| 2014/0118524 A1 | 5/2014 | Munck et al. |
| 2014/0126801 A1 | 5/2014 | Callahan et al. |

OTHER PUBLICATIONS

Taehee Lee, "Multithreaded Hybrid Feature Tracking for Markerless Augmented Reality", IEEE Transaction on Visualization and Computer Graphics, vol. 15, No. 3, May/Jun. 2009.

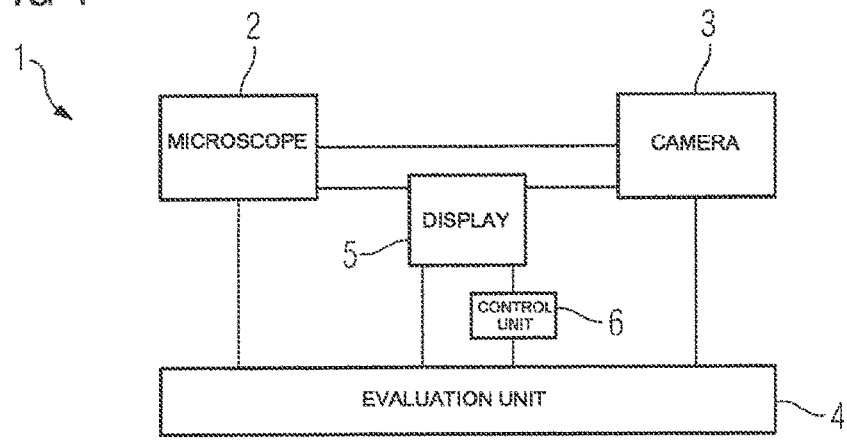
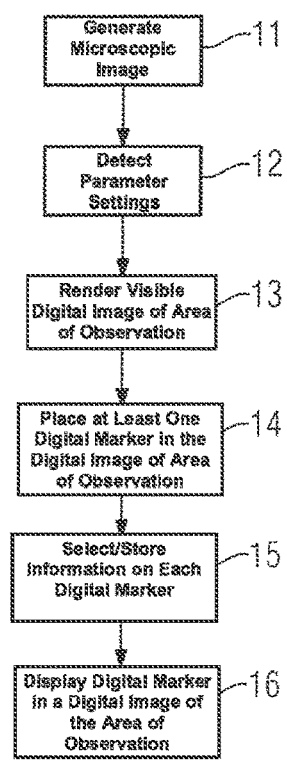

MICROSCOPE SYSTEM AND MICROSCOPY METHOD USING DIGITAL MARKERS

BACKGROUND

1. Field of the Invention

The present invention relates to a microscope system, for example to an operating microscope system, particularly for neurosurgical applications. The invention further relates to a microscopy method, for example for an operating microscope, particularly for neurosurgical applications.

2. Description of the Related Art

Document DE 10 2010 039 289 A1 discloses a microscopy system with operating microscope for generating a microscopic image, a laser scanning endoscope for generating an endoscopic image, a reflection device for reflecting representations into the microscopic image, and with a detector that establishes a position of the endoscope and generates corresponding positional data. In the framework of this solution, the laser scanning endoscope must be equipped with an additional sensor, so that the position of the endoscopy tip relative to a defined reference point in space can be determined, stored and also called up again later. Tissue deformations occurring during the intervention, for example as a result of breathing, removal of tissue, or the like, are not taken into account.

In the document US 2011/0280810 A1, a microscopy system consisting of a surgical microscope and an endomicroscope. In one embodiment, the temporal monitoring of the endomicroscope is provided by mounting an additional sensor on the tool tip and/or using commercial navigation solutions. Here as well, tissue deformations are not taken into account.

Navigation device manufacturers, such as Xion Medical, Brain Lab, Medtronic and others, for example, use the "classic" approach based on external navigation devices, for example optical or electromagnetic navigation devices in order to enable digital markers in the operating field. For this purpose, however, the surgical instruments require special markers, such as infrared balls, for example.

Previously, surgeons relied on physical markers or on their own memory in order to mark important points within an operating field or within an area of observation to be studied microscopically. These points are needed, for example, in order to mark functional brain regions in a neurosurgical operation, document biopsy removal sites, for example in the case of a tumor resection, or in order to document positions of endoscopic recordings. Physical markers have the drawback, however, that they cover parts of the tissue for one and, for another, can inadvertently change the position as a result of tissue deformations and/or surgical activities. Mental markers have the drawback that they are only "visible" for the surgeon and cannot be documented.

Previously known solutions for digital markers require external navigation solutions or the application of special markers. However, tissue deformations cannot be compensated, since changes in the current area of observation, for example in the current operating field, are not taken into account.

It is therefore the object of the present invention to make available an advantageous microscope system and a corresponding microscopy method which enables the use of digital markers and simultaneously takes changes in the area of observation to be studied, for example as a result of movements of the microscope or tissue deformations, into account.

SUMMARY OF THE INVENTION

The microscope system according to the invention comprises a microscope for generating a microscopic image of an area of observation to be studied and a camera for recording image-based information of the area of observation to be studied and for generating a digital image of the area of observation to be studied. The microscope system further comprises a storage and evaluation unit for detecting parameter settings of the microscope associated with the image-based information, a display for displaying the digital image of the area of observation to be studied and a control unit connected to the storage and evaluation unit and to the display. The control unit is designed to place a number of digital markers for marking observed objects in a digital image, for example in the digital image generated with the aid of the camera, of the area of observation to be studied and for displaying the placed digital markers on the display. Furthermore, the storage and evaluation unit is designed to select or extract and to store information on each digital marker so that the marker can be associated at a later point in time with the position of the observed object in the area of observation and displayed in a digital image of the area of observation to be studied generated at the later point in time in order to mark the position of the observed object.

In the context of the present invention, i.e., also in relation to the method according to the invention, the term "information" can, as a matter of principle, also include the positional information to the extent that positional information is present.

The microscope system according to the invention has the advantage that digital markers are made available that are robust with respect to changes in the area of observation, for example in the operating field, particularly as a result of tissue deformations. Moreover, the digital markers that can be generated with the aid of the microscope system are robust with respect to movements of the microscope, for example of a surgical microscope. A point that is marked in an area of observation to be studied can thus be found again with the aid of the microscope system according to the invention, even in the event of changes in the area of observation, for example as a result of deformations or shifts or due to movements of the microscope, and reliably associated with the originally marked point or the originally marked position.

The area of observation to be studied can be an operating area, for example, particularly a surgical operating area such as a neurosurgical operating area, for example, or, more generally, an area of investigation or work or a field being observed.

In principle, the camera can be connected to the microscope. For example, the camera can be integrated into the microscope. It can therefore be ab internal camera. The microscope used is preferable an operating microscope, for example a surgical, particularly a neurosurgical operating microscope or an endomicroscope or a microscope for the removal of biopsies.

Due to the fact that, with the aid of the microscope system according to the invention, image-based information on the area of observation to be studied, for example the operating field, and, in addition, parameter settings of the microscope can be used, no physical markers, for example color markings, need be applied to the deformable tissue. Moreover, no additional external sensors need to be mounted or external navigation solutions used or existing navigation solutions adapted. For instance, the image-based information on an operating field can be recorded by an internal camera of a surgical microscope and parameter settings of the microscope simultaneously stored. The storage and evaluation unit is preferably designed to detect the parameter settings zoom and/or focus of the microscope.

The inventive image-based recognition of markers in the deformable tissue does make it possible in principle not to mount any additional sensors or markers. However, if navigation data, particularly the relative or absolute position of the surgical microscope in space to the patient, are present—whether through an external solution or an internal solution in which the surgical microscope itself recognizes or determines how it has moved over time in space (by means of integrated sensors on the microscope axes, for example), so that it therefore determines and optionally stores the relative change between two image recordings—this information can be used to support the image-based recognition. For example, if the respective viewing angle to the field is known, the searching space can be better delimited.

The camera used can be designed, for example, to record image-based information as a video image of the area of observation being observed through the microscope. The digital image of the area of observation can therefore be a video image of the area of observation being observed through the microscope taken by the camera, for example.

Moreover, the control unit for setting and displaying a number of digital markers can comprise a touchscreen and/or a device for gesture control and/or a device for speech control. The device for gesture control can be designed such that it enables control by finger, hand or instruments, such as surgical instruments. With the aid of the control unit for setting and displaying a number of digital markers, digital markers can be placed, for example, in the digital image of an operating field, for example in the video image of a surgical microscope.

The control unit for setting and displaying the digital markers is preferably designed so as to place and display digital markers in the form of points and/or lines and/or circles and/or polygons and/or freeform contours. This enables versatile and individualized structuring of the markers used appropriate to the respective situation.

Moreover, the control unit for setting and displaying the digital markers is preferably designed to show and hide the digital markers in the display. This makes it possible to make the area covered by the marker visible as desired. In this way, tissue lying under the marker is not covered.

What is more, the display for displaying the digital markers in the digital image of the area of observation can be embodied by an ocular of the microscope. This makes it possible for the placed markers to be visible directly through the ocular of the microscope, i.e., without the need for an additional display outside of the microscope. In addition or alternatively, the display for displaying the digital markers in the digital image of the area of observation can be embodied as a display unit arranged externally from the microscope. This makes it possible, for example, for a plurality of people to observe the placed markers and monitor them as desired.

The storage and evaluation unit is embodied, for example, such that the position of the respective marker in the area of observation can be associated again at a later point in time with the position of the originally marked observed object in the area of observation and/or the position of the marker and hence of the marked observed object in the area of observation can be followed over time. This offers the advantage that changes in the position of the observed object in the area of observation, for example as a result of a deformation of observed tissue or due to tissue removal, can be taken into account with respect to the current position of the marked observed object.

The microscope system also has a navigation unit for detecting kinematic positional information of the microscope. The navigation unit can be integrated into the microscope or arranged externally. The navigation unit for detecting kinematic positional information of the microscope can particularly be designed to determine the viewing angle to the area of observation, for example an operating area, and/or to determine an absolute position of the microscope, for example the initial position.

What is more, the microscope system can comprise a unit for detecting topographic information over the area of observation. This can be achieved, for example, by means of a 3D sensor or a stereoscopic recording unit. In this way, the height profile in the vicinity of the observed object of the markers is made more readily identifiable and can be better followed.

The storage and evaluation unit is preferably designed to analyze image information in the vicinity of the respective digital marker with the aid of feature descriptors and describe it on the basis of characteristic features. This can be achieved, for example, through the use of the feature descriptors commonplace in the computer vision community, such as SIFT, SURF, BRIEF, ORB, or other feature descriptors. In this case, the storage and evaluation unit is designed for the use of the cited feature descriptors. In addition, the storage and evaluation unit is preferably designed to save parameter settings of the microscope, for example of the surgical microscope, together with the respective marker. For example, the focus and/or zoom of the microscope can be saved with the respective marker in order to calculate the current image enlargement, so that the zoomed area can be adjusted at another setting accordingly. If present, the navigation data can also be stored in the storage and evaluation unit; for example, they can be stored together with the marker. As a result, it is possible, for example, to move again to the spatial position when the corresponding marker is selected. Moreover, if the microscope has moved, the change in viewing angle can be calculated and this information can be taken into account in the image-based recognition of the markers.

In the context of the microscopy method according to the invention, a microscopic image of an area of observation to be studied is generated with a microscope. Using a camera, for example using a camera connected to the microscope, image-based information on the area of observation to be studied is recorded, and a digital image is generated of the area of observation to be studied. Furthermore, parameter settings of the microscope associated with the image-based information are detected, for example with the aid of a storage and evaluation unit connected to the microscope and the camera. The digital image of the area of observation to be studied is rendered visible, for example with the aid of a display. A number of digital markers are placed in order to mark observed objects in a digital image of the area of observation to be studied and displayed. The markers can be set with the aid of a control unit, for example.

The digital image in which the markers are placed and displayed can be a digital image generated with the aid of a camera, for example. The control unit can be connected to a storage and evaluation unit and to a display.

Moreover, in the context of the microscopy method according to the invention, information is selected and extracted and stored for each digital marker so that the marker can be associated at a later point in time to the position of the observed object in the area of observation. This can be done with the aid of a storage and evaluation unit, for example. Finally, in the context of the method according to the invention, the digital marker is displayed in a digital image of the area of observation to be studied generated at a later point in time in order to mark the position of the observed object.

In principle, the microscopy method according to the invention has the same advantages as the microscope system described previously. The method according to the invention can particularly be carried out with the aid of a microscope system described previously. A previously described microscope system can therefore be used in the context of the microscopy method according to the invention.

In the method, for example, the zoom and/or focus of the microscope can be detected by a storage and evaluation unit, for example. Preferably, zoom and/or focus of the microscope are detected continuously. The cited parameter settings of the microscope can be associated with set digital markers. If present, navigation in the storage and evaluation unit can also be stored in this context; for example, they can be stored together with the marker. As a result, it is possible to move again to the spatial position when the corresponding marker is selected. Furthermore, insofar as the surgical microscope has moved, the change in viewing angle can be calculated and this information can be taken into account during the image-based recognition of the markers.

Preferably, the area of observation is evaluated continuously by means of image processing algorithms, and the position of the digital markers is adapted to the position of the observed object in the event of changes such as deformations, particularly tissue deformations, of the observed object in the area of observation and/or in the event that the microscope is moved. For example, the position of the markers is adjusted, preferably continuously, to the position of the observed object using tracking algorithms.

Moreover, image processing algorithms can be used to continuously evaluate an operating area or an operating field, particularly and specifically the recorded video stream of a surgical microscope, so that the positions of a set marker can be adapted to a change in the position of the marked observed object. Possible changes in the position of the marked observed object can be caused by tissue deformations and/or by movement of the surgical microscope.

Tracking algorithms from the field of computer vision can be used for the adjustment. For example, methods can be used here that are based on the optical flow, such as a Kanade-Lucas-Tomasi feature tracker, and optionally hybrid trackers that combine the optical flow with feature descriptors in order to increase the robustness of the tracker (for example, see Lee, Taehee and Höllerer, Tobias, Multi-threaded Hybrid Feature Tracking for Markerless Augmented Reality, IEEE Transactions on Visualization and Computer Graphics, Vol. 15, No. 3, May/June 2009 and http:/dx.doi.org/10.1109/TVCG.2008.190).

Since changes in the zooming and focusing of the surgical microscope can change the image enlargement and thus the search area, the parameters are preferably read out continuously and used by the tracking algorithm. Optionally, the tracking algorithm can be supported by the additional information sources already mentioned previously; particularly, additional parameter settings of the surgical microscope, positional information, topographic information, etc., in order to enable better delineation of search areas, for example, particularly place and scale, or to make more information available for the feature descriptors, particularly topographic features.

Moreover, through the use of tracking algorithms for each marker, it is possible to determine a probability of its positional accuracy, through calculation, for example. This probability of the positional accuracy of the respective marker can be stored together with the marker as well as on an output unit, for example a display.

Furthermore, information for the determination of an expiration time of the respective marker can be established for a marker. The marker can thus be associated with a kind of "expiry time" or "expiration date" or "use-by period." What is more, information for determining the positional accuracy of a marker can be established for it. This can be stored together with the marker. For example, a marker can be declared or characterized as invalid or be deleted if an established accuracy threshold for its positioning has been exceeded or if its positioning is no longer possible within an established accuracy threshold. This can be the case with heavy tissue resections, for example.

In the context of the microscopy method according to the invention, the digital markers can be rendered visible or displayed by an ocular of the microscope. Alternatively or in addition, the digital markers can be represented or displayed by at least one display unit or output unit arranged externally to the microscope. Moreover, the digital markers can be shown and hidden as needed. This makes it possible to examine areas of observation that might be covered by the marker.

In addition, a probability for the positional accuracy of the respective marker can be determined for markers. The marker can be associated with the determined probability. If a probability for the positional accuracy of the respective marker has been determined for markers, a filter can also be used in order to show only markers with a minimum probability.

Optionally, a marker can be selected and the position of the observed object sighted through the microscope. This makes is possible to select individual markers and to focus through the microscope, for example the surgical microscope, in a targeted manner. The kinematic characteristics of the microscope can be exploited in order to first move to the desired location, i.e., the spatial position, whose navigation data were originally detected with the marker before it is sighted and optionally focused on. This makes it possible to locate the originally marked positions quickly and precisely.

Moreover, the placed markers can optionally be permanently stored together with the image information for documentation purposes and transferred to a data management system such as PACS, for example.

The inventive microscope system and the inventive microscopy method enable the use of image-supported information for the creation of robust digital markers—e.g., which are insensitive in relation to tissue information—for a microscope, preferably a surgical microscope, without the use of additional navigation solutions or external markers. Consequently, no physical markers, such as color markings in the deformable tissue, need to be applied. Moreover, no additional external sensors need to be put in place or external navigation solutions used or existing navigation solutions adapted.

The inventive image-based image recognition of markers in deformable tissue does make it possible in principle not to mount any additional sensors or markers. However, insofar as navigation data, particularly the relative or absolute position of the surgical microscope in the space to the patient, are present—whether through an external solution or an internal solution in which the surgical microscope itself recognizes or determined how it has moved over time in space, so that it thus determines and optionally stores the relative change between two recorded images—this information can be used to support the image-based recognition. For example, if the respective viewing angle to the area is known, the search space can be better delimited.

Moreover, the use of specific characteristics of the microscope, particularly of the surgical microscope, is enabled for improved tracking of the markers. In addition, image-supported digital markers can be integrated into the microscopic or surgical procedure with the aid of the present invention.

Additional features, characteristics and advantages of the present invention are described in further detail below on the basis of exemplary embodiments with reference to the enclosed figures. All of the features described above and in the following are advantageous both alone and in any combination with each other. The exemplary embodiments described below merely constitute examples that do not limit the subject matter of the invention.

BRIEF DESCRIPTION OF THE DRAWINGS

FIG. 1 shows a schematic view of a microscope system according to the invention.

FIG. 2 shows a schematic view of an example of a method according to the invention in the form of a flowchart.

DETAILED DESCRIPTION

One example of a microscope system according to the invention is explained in further detail below with reference to FIG. 1. FIG. 1 shows a schematic view of a microscope system 1 according to the invention. It comprises a microscope 2, a camera 3, a storage and evaluation unit 4, a display 5 and a control unit 6. The microscope 2 can be a surgical microscope or an operating microscope or an endomicroscope or a microscope for use in the context of biopsy removal.

The microscope 2 is connected to the camera 3. For this purpose, the camera 3 can preferably be integrated into the microscope 2. Alternatively, the camera 3 can be arranged externally from the microscope 2. The display 5 is connected to the microscope 2 and the camera 3. The display 5 can be embodied as a display unit arranged externally from the microscope 2 and/or camera 3. Alternatively, the display 5 can be integrated into the microscope 2, for example in order to enable a display through the ocular of the microscope.

Moreover, the microscope 2, the display 5 and the camera 3 are connected to the storage and evaluation unit 4. The storage and evaluation unit 4 can be embodied, for example, as a CPU or GPU or comprise a CPU or GPU. The storage and evaluation unit 4 is particularly designed to receive information or data from the microscope 2 and the camera 3, evaluate or analyze it and output it to the display 5.

The control unit 6 is connected to the display 5 and the storage and evaluation unit 4. With the aid of the control unit 6, signals can be transferred to the display 5 and to the storage and evaluation unit 4. For example, digital markers can be placed in digital images recorded by the camera and rendered visible via the display 5. At the same time, the set digital markers can be stored an analyzed together with additional information by the storage and evaluation unit 4.

Alternatively to the arrangement shown in FIG. 1, the microscope 2 and/or the camera 3 can be connected indirectly to the display 5, being connected to the display 5, exclusively via the storage and evaluation unit 4, for example.

The inventive method will now be explained in further detail with reference to FIG. 2. Schematic FIG. 2 shows an example of a method according to the invention in the form of a flowchart. In a first step 11, a microscopic image of an area of observation to be studied is generated with a microscope 2 and image-based information on the area of observation to be studied is recorded with a camera 3. In this context, a digital image is generated of the area of observation to be studied.

In a second step 12, which can be performed simultaneously with the first step 11, parameter settings of the microscope 2 associated with the image-based information are detected. This can be achieved with the aid of a storage and evaluation unit 4 connected to the microscope 2 and the camera 3.

In another step 13, which can be performed simultaneously with one or both of the abovementioned steps 11 and/or 12, the digital image of the area of observation to be studied is rendered visible, preferably with the aid of a display 5.

Then, in a next step 14, a number of digital markers, i.e., at least one marker, for marking observed objects, i.e., for marking at least one observed object, is placed in the digital image of the area of observation to be studied and displayed. The placed markers can be rendered visible with the aid of the previously mentioned display 5, for example.

In another step 15, information on each digital marker is selected or extracted and stored so that the marker can be associated at a later point in time with the position of the observed object in the area of observation. In a next step 16, the digital marker is displayed in a digital image of the area of observation to be studied generated at a later point in time in order to mark the position of the observed object. A digital image of the area of observation to be studied is thus generated at a later point in time and the position of the observed object in the area of observation to be studied is displayed at a later point in time. This can preferably be achieved with the aid of a storage and evaluation unit 4.

In principle, the method according to the invention can comprise additional method steps. For example, the digital markers can be shown and hidden so that the underlying area of observation—tissue for example—is not covered. The digital markers can be embodied in the form of points, lines, polygons or freeform contours, for example. They can be placed in the digital image of the area of observation, for example an operating field, specifically in the video image of the surgical microscope, by means of a touchscreen, through gesture control, for example with the aid of fingers, the hand or surgical instruments, or by means of speech control.

A series of information is extracted and stored for each marker, so that the marker can later be associated again with a position of an observed object in the area of observation, for example in an operating area and/or followed over time. For this purpose, image information in the close proximity of the markers is analyzed (so-called feature descriptors) and described using characteristic features. This can be done using features descriptors that are commonplace in the computer vision community, such as SIFT, SURF, BRIEF, ORB or others.

The parameter settings of the microscope, for example of the surgical microscope, are stored together with the marker. For example, these can be the focus and/or zoom of the microscope in order to calculate the current image enlargement, for example, thus enabling adaptation according to the search area at another setting. Optionally, kinematic positional information of the microscope system can also be stored intrinsically or via external navigation solutions, for example. This can be done, for example, in order to determine the viewing angle to the area of observation, for example to the operating area, and in order to determine an initial absolute position.

Moreover, topographic information of the area of observation, for example of the operating area, can also be detected and stored in order to enable better recognition and monitoring of the marker through the height profile in the vicinity of the marker. This can be achieved, for example, by a 3D sensor or stereoscopic recordings.

The area of observation, for example the operating area, specifically the video stream of the surgical microscope, is continuously evaluated by means of image processing algorithms so that the positions of the markers can be adapted to changes in the vicinity of the marker. For example, the position of the markers can be adapted in relation to changes caused by tissue deformations and/or move of the (for example surgical) microscope.

Tracking algorithms from the area of computer vision are used during evaluation and adjustment. For example, they can involve methods that are based on the optical flow, such as a Kanade-Lucas-Tomasi feature tracker, and optionally hybrid trackers that combine the optical flow with feature descriptors in order to increase the robustness of the tracker. One example of this can be found in Lee, Taehee and Höllerer, Tobias, Multithreaded Hybrid Feature Tracking for Markerless Augmented Reality, IEEE Transactions on Visualization and Computer Graphics, Vol. 15, No. 3, May/June 2009.

Since changes in the zooming and focusing of the surgical microscope can change the image enlargement and thus the search area, the parameters are preferably read out continuously and used by the tracking algorithm. Optionally, the tracking algorithm can be supported by the additional information sources already mentioned previously, such as additional parameter settings of the surgical microscope, positional information, topographic information, etc., in order to enable better delineation of search areas, for example place and scale, or to make more information available for the feature descriptors, for example topographic features.

Optionally, the tracking algorithm calculates a probability of positional accuracy for each marker which is stored together with the marker and can also be displayed on an output unit. Also optionally, markers can be provided with a "use-by date" or expiration time or period of validity. The markers can be declared invalid if positioning is no longer possible or lies beyond an accuracy threshold. For example, this can be caused by heavy tissue resections in relation to a surgical, for example a neurosurgical, operation.

The digital markers can be represented via the ocular and/or an external display unit 5 or several external display units and can be shown and hidden as needed. If the markers are provided with probabilities, a filter can optionally be used and activated in order to show only markers with a minimum probability.

Optionally, individual markers can be selected and sighted through the microscope. The individual markers can particularly be focused on through the surgical microscope 2 in a targeted manner. If available, the microscope, preferably the surgical microscope, can exploit its kinematic characteristics in order to first move to the desired location before focusing. Optionally, the placed markers can be permanently stored together with the image information and transferred to a data management system, for example PACS, for documentation purposes.

Various areas of application, namely an application in relation to an endomicroscope, a biopsy and the marking of functional areas of the brain during tumor resection are named and briefly explained below.

With regard to endomicroscopy, a surgeon can additionally use an endomicroscope in the visual field of the surgical microscope for cellular diagnosis, when an endoscopic image is taken, the endomicroscope can be automatically detected in the image field of the surgical microscope, a marker placed on the tip of the endomicroscope, and the recorded endoscopic image linked to the marker. The marker can be monitored over the further course of the operation. By clicking on the marker on a touchscreen of the surgical microscope at its current position, the associated recorded endoscopic image can be called up at any time.

With regard to biopsies, several minutes typically pass between the removal of the biopsy and the pathologist's report. However, since the surgeon may be continuing with the operation, they will want to know retrospectively when the pathology report comes in where the specimens were taken. For this reason, the place in the image at which the biopsy is taken is marked during removal of the biopsy on the touchscreen of the surgical microscope. Optionally, a textual label and/or ID can also be added to the marker. The placed markers are monitored over the further course of the operation, so that, when the pathology report arrives, the surgeon can select the stored markers via a menu system in the touchscreen and have the surgical microscope focus on them automatically.

With regard to tumor resections in the brain, functional areas or functional areas of the brain can be determined through stimulation after the craniotomy and digital markers can be placed for the various functional regions, for example through marking on site with the automatically detected tool tip and placing the marker using a foot switch. These markers can be monitored over the further course of the tumor resection, so that the functional areas can continue to be superimposed over the operating area as markers despite possible tissue deformations and removal of tissue.

LIST OF REFERENCE SYMBOLS

1 microscope system
2 microscope
3 camera
4 storage and evaluation unit
5 display
6 control unit
11 Generation of a microscopic image and recording of image-based information
12 Detection of parameter settings of the microscope and association with the image-based information
13 Displaying of the digital image
14 Placement and displaying of digital markers
15 Selection and storage of information associated with the marker
16 Displaying of the marker at a later point in time to mark the position of the observed object

What is claimed is:

1. A microscope system comprising:
 a microscope for generating a microscopic image of an area of observation to be studied;
 a camera for recording image-based information on the area of observation to be studied and for generating a digital image of the area of observation to be studied;

a storage and evaluation unit connected to the microscope and the camera for detecting parameter settings of the microscope associated with image information, a display for rendering visible the digital image of the area of observation to be studied, and an input device connected to the storage and evaluation unit and to the display, the input device configured to embed digital markers for marking observed objects in the digital image when the digital image is displayed on the display, wherein the storage and evaluation unit is designed to select and store information on each digital marker to associate the digital marker with a position of the observed object in the area of observation and in the digital image of the area of observation at a later point in time, the digital marker is embedded at a location in the digital image characterized by the image information, and wherein the storage and evaluation unit is configured to evaluate the area of observation periodically by image processing algorithms and synchronize the position of the digital markers to the position of the observed object in an event of changes in the observed object in the area of observation or in an event of movement of the microscope, wherein the storage and evaluation unit is configured to analyze the image information contained in the digital image in the vicinity of a respective marker describe the image information with respect to characteristic features, associate the characteristic features with the respective marker and store the association such that it is retrievable;

wherein the storage and evaluation unit is configured to perform at least one of the following:

detect at least one of: parameter settings of zoom and a focus of the microscope;

associate, again at a later point in time, the position of the digital marker in the area of observation with at least one of the position of the originally marked observed object in the area of observation and the position of the marker and hence of the marked observed object in the area of observation can be followed over time; and analyze image information in the vicinity of the respective digital marker with the aid of feature descriptors and describe it on the basis of characteristic features.

2. The microscope system of claim 1, wherein the microscope is an operating microscope or an endomicroscope or a microscope for biopsy removal.

3. The microscope system of claim 1, wherein the input device for placing and displaying a number of digital markers comprises a touchscreen and/or a device for gesture control and/or a device for speech control, and/or the input device for placing and displaying a number of digital markers is designed so as to embed and display digital markers in the form of points and/or lines and/or circles and/or polygons and/or freeform contours, and/or the input device for setting and displaying the digital markers is designed to show and hide the digital markers in the display.

4. The microscope system of claim 1, wherein
the display for rendering visible the digital markers in the digital image of the area of observation display is embodied by an ocular of the microscope and/or the display is embodied as a display unit arranged externally from the microscope.

5. The microscope system of claim 1, further comprising a navigation unit for detecting kinematic positional information of the microscope.

6. The microscope system of claim 1, further comprising a unit for detecting topographic information on the area of observation.

7. A microscopy method, wherein a microscopic image of an area of observation to be studied microscopically is generated with a microscope, and image-based information on the area of observation to be studied microscopically is recorded with a camera and a digital image of the area of observation to be studied is generated, the method comprising:

parameter settings of the microscope associated with the image-based information;

rendering visible the digital image of the area of observation to be studied is rendered visible, embedding a number of digital markers in the digital image of the area of observation to be studied and displayed, selecting and storing information on each digital marker so that the marker can be associated at a later point in time with the position of the observed object in the area of observation, displaying the digital marker in a digital image of the area of observation to be studied generated at a later point in time in order to mark the position of the observed object, and evaluating the area of observation periodically by image processing algorithms and synchronizing the position of the digital markers to the position of the observed object in an event of changes in the observed object in the area of observation or in an event of movement of the microscope, and analyzing the image information contained in the digital image in the vicinity of a respective marker describe the image information with respect to characteristic features, associating the characteristic features with the respective marker and storing the association such that it is retrievable;

wherein the storage and evaluation unit is configured to perform at least one of the following:

detecting at least one of: parameter settings of zoom and a focus of the microscope;

associating, again at a later point in time, the position of the digital marker in the area of observation with at least one of the position of the originally marked observed object in the area of observation and the position of the marker and hence of the marked observed object in the area of observation can be followed over time; and analyzing image information in the vicinity of the respective digital marker with the aid of feature descriptors and describe it on the basis of characteristic features.

8. The microscopy method of claim 7, wherein the position of the markers is adapted to the position of the observed object using tracking algorithms.

9. The microscopy method of claim 7, wherein a marker is selected and the position of the observed object is sighted through the microscope.

* * * * *

UNITED STATES PATENT AND TRADEMARK OFFICE
CERTIFICATE OF CORRECTION

PATENT NO. : 10,302,932 B2
APPLICATION NO. : 16/168886
DATED : May 28, 2019
INVENTOR(S) : Stefan Saur et al.

It is certified that error appears in the above-identified patent and that said Letters Patent is hereby corrected as shown below:

On the Title Page

Item [72], delete "Marco WITZBACH" and insert -- Marco WILZBACH. --

Signed and Sealed this
Seventh Day of January, 2020

Andrei Iancu
*Director of the United States Patent and Trademark Office*